United States Patent [19]

Koroknay et al.

[11] 4,065,148
[45] Dec. 27, 1977

[54] ANTI-JACK-KNIFING APPARATUS

[75] Inventors: László Koroknay; Janos Urbantsok, both of Budapest, Hungary

[73] Assignee: Autoipari Kutato Intezet, Budapest, Hungary

[21] Appl. No.: 704,946

[22] Filed: July 13, 1976

[30] Foreign Application Priority Data

July 14, 1975 Hungary .............................. AU 345

[51] Int. Cl.² .......................................... B62D 53/08
[52] U.S. Cl. .................................................. 280/432
[58] Field of Search ....................................... 280/432

[56] References Cited
U.S. PATENT DOCUMENTS 3,512,803  5/1970  Hines .................... 280/432
3,515,409  6/1970  Hines .................... 280/432

Primary Examiner—Joseph F. Peters, Jr.
Assistant Examiner—R. Schrecengost

[57] ABSTRACT

Anti-jack-knifing apparatus for articulated vehicles, wherein the anti-jack-knifing force is exerted independently of the operation of the vehicle braking system by the provision of a hydraulic pressure source including two working chambers communicating via a throttling bore in a piston, the moving part of the pressure source being connected to the trailer while the stationary part is fixedly connected to the tractor, and the working spaces of the pressure source are connected with the brake cylinder of the anti-jack-knifing brake construction to actuate the latter, via throttle valve units including by-pass ducts and non-return valves.

4 Claims, 4 Drawing Figures

ANTI-JACK-KNIFING APPARATUS

BACKGROUND OF THE INVENTION

1. Field of the Invention

The invention concerns anti-jack-knifing apparatus for articulated vehicles, primarily for tractor-type vehicles and articulated buses or coaches; hereafter, for simplicity, the driven and towed units of the articulated vehicle will be referred to as "tractor" and "trailer".

2. Discussion of the Prior Art

Anti-jack-knifing devices are known which exert a braking moment around a king-pin, that articulates a tractor and a trailer together, against the moment of forces tending to cause jack-knifing of the tractor when the tractor or the trailer is braked. Thus for instance British Pat. No. 1,256,947 discloses anti-jack-knifing apparatus wherein the braking moment is provided by a disc brake comprising a plurality of plates. The stationary part of the brake is fixed to the base or rubbing plate of the trailer while the rotary part is connected with the king-pin.

In deviation from conventional constructions, the king-pin is not fixed rigidly to the rubbing surface of the trailer, but instead has a tongue which fits into an appropriately formed part of the coupling on the tractor and thus rotates with the tractor. The plates of the brake are clamped together by a compressed air-operated piston. The air supply is taken from the emergency air brake system of the trailer and is controlled by a special valve which is built into the air brake system of the trailer.

In another known construction disclosed in British Pat. No. 1,240,554 the anti-jack-knifing brake device is located at the steered front shaft of the trailer and is operated by a brake chamber connected with the brake system of the trailer.

In the construction known from British Pat. No. 1,295,045, the anti-jack-knifing device includes pistons for a disc brake which also receive pressure from the wheel brake system of the vehicle, but only when a predetermined pressure in the brake system of the vehicle has been exceeded.

In the construction disclosed in British Pat. No. 1,243,005 the anti-jack-knifing brake device is installed in the trailer and is air-operated. A special valve, controlled by wheel slip sensing means, permits air to pass from a tank into the brake system.

The main disadvantage of the above-mentioned known constructions, except for that of the above-mentioned British Pat. No. 1,243,005, is that the control of the anti-jack-knifing braking system is coupled to the operation of the braking system of the vehicle. These known control systems start from the premise that the lateral supporting force of the tires decreases and thus the possibility of jack-knifing arises when the wheels at the rear tractor shaft lock on breaking.

However, there is no necessary logical connection between braking locking and jack-knifing, since there can be factors other than wheel locking to cause a decrease or elimination of the lateral support forces on the tires mounted on the rear shaft, and if jack-knifing results from a circumstance other than braking, the known anti-jack-knifing devices are ineffective.

In the known devices, the anti-jack-knifing brake construction exerts a braking force the magnitude of which depends on the controlling pressure of the brake valve. In this way the upper limit of the braking effort that can be exerted is limited since the anti-jack-knifing braking construction is unable to render the articulated vehicle rigid when braking occurs during the negotiation of a bend.

SUMMARY OF THE PRESENT INVENTION

The present invention seeks to provide an anti-jack-knifing braking system which eliminates, or at least reduces, the disadvantages of known constructions, and which makes the generation and actual magnitude of anti-jack-knifing forces independent of the operation of the main vehicle braking system. It is not necessary to alter the customary construction of the king-pin and the coupling.

In the construction proposed in the present invention the anti-jack-knifing force is exerted independently of the operation of the vehicle braking system by the provision of a hydraulic pressure source having a piston actuated by a rotary vane or a rack-and-pinion device with a constriction or a throttling bore, provided in the rotary vane or piston the moving part of the pressure source being connected to the trailer while the stationary part is fixedly connected to the tractor. The working spaces or chambers of the pressure source are connected with the brake cylinder of the anti-jack-knifing brake construction and actuate the latter.

The present invention accordingly consists in an anti-jack-knifing mechanism for articulated vehicles, primarily for tractors wherein the king-pin connecting the tractor and the trailer is arranged coaxially with a disc brake mechanism, having elements braked relative to each other and respectively secured to the tractor and to the trailer, characterized in that one member of the articulated vehicle is connected to a stationary part of a hydraulic pressure source while its other member is connected to a moving part of the hydraulic pressure source. The two working spaces of the pressure source communicating by way of a throttled opening, are connected to the working cylinder of the brake mechanism by way of a controllable throttling valve provided with a by-pass duct having a respective non-return valve.

In a preferred, exemplary embodiment of the present invention the anti-jack-knifing brake mechanism is a disc brake the disc of which is connected to the trailer while a calliper part is floatingly connected to the tractor, the floating calliper being provided with an adjusting mechanism.

According to a further preferred embodiment of the present invention, the brake adjusting mechanism has a spring-loaded roller fitting into a groove, preferably V-shaped, disposed at the inner diameter of the segment-shaped brake disc; the roller is axially fixed on a pin guided on the floating brake calliper and a split plate spring is loosely fitted on the pin and fitted in a pre-tensioned manner in a bore of the floating disc calliper with axial play. Brake adjustment takes place when the floating brake calliper is displaced by an amount exceeding the axial play relative to the brake disc.

BRIEF DESCRIPTION OF THE DRAWINGS

The invention is described by way of example with reference to the accompanying drawings, wherein.

DESCRIPTION OF THE PREFERRED EMBODIMENT

Figure 1:
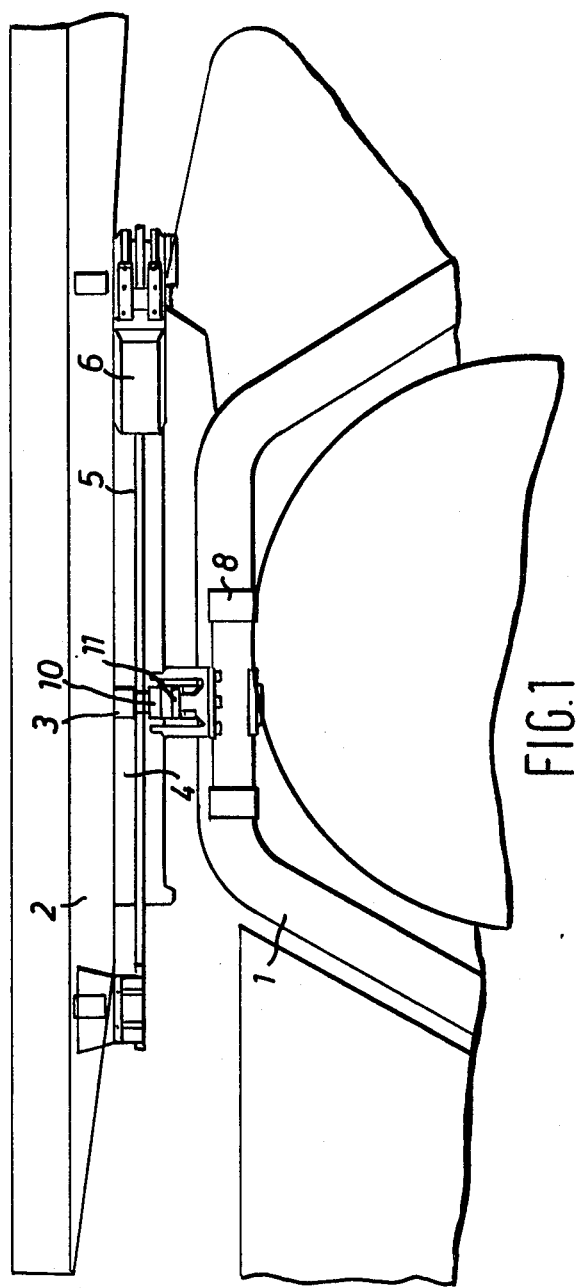
FIG. 1 is a side view of the connection between a tractor and a trailer and anti-jack-knifing apparatus embodied in the invention.
Figure 2:
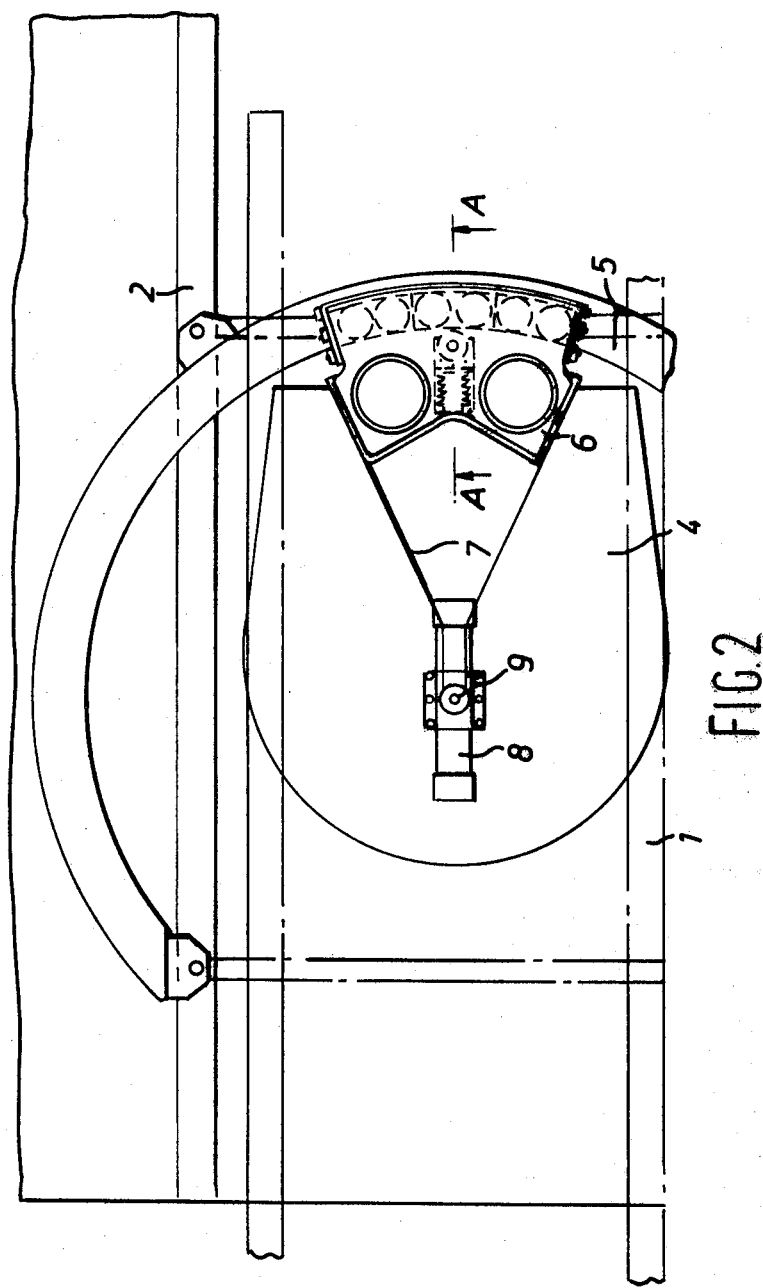
FIG. 2 is a plan view of the construction of FIG. 1.

Referring to the drawings a coupling 4 of a tractor 1 is connected to a trailer 2 by way of a king-pin 3. The anti-jack-knifing brake construction is formed as a disc brake having a brake disc 5 in the form of an arcuate segment fixed to the trailer 2 and floating brake callipers 6 fixed in a V-shaped groove 7 of the coupling 4 of the tractor 1. A hydraulic pressure source 8 has a moving part 9 connected to a shoulder 10 welded to the bottom surface of the king-pin 3 by way of an intermediate member 11. A stationary part of the hydraulic source 8 is connected to the coupling 4.

Figure 3:
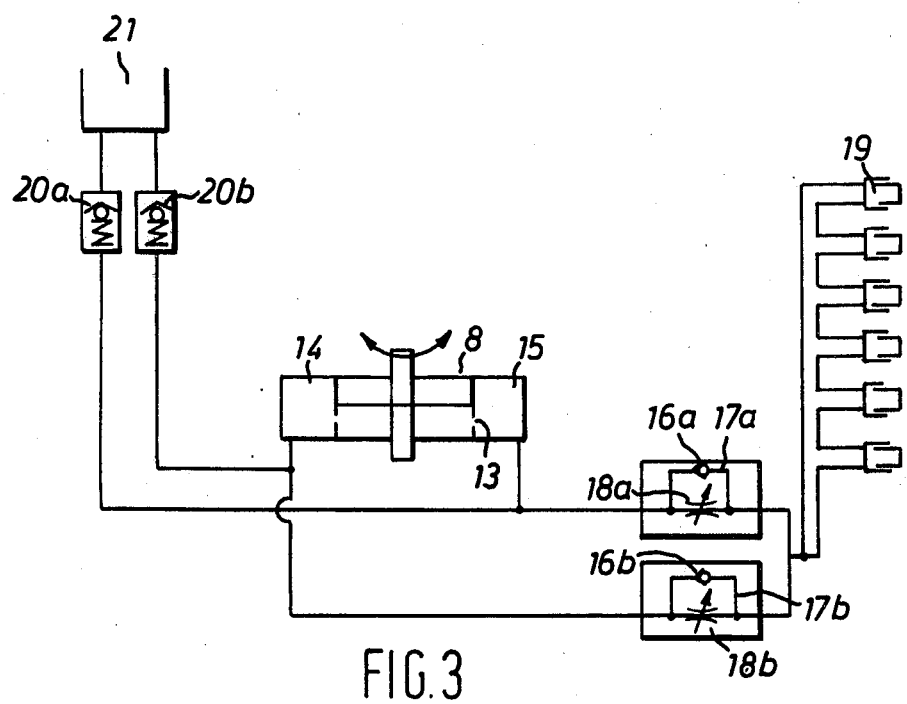
FIG. 3 is a diagrammatic lay-out of a hydraulic system of the anti-jack-knifing apparatus of FIGS. 1 and 2.

The hydraulic pressure source 8 has two working chambers or spaces 14, 15 (FIG. 3) respectively connected with a hydraulic reservoir 21 by way of non-return valves 20a, 20b. Small bores 13 permit flow communication between the working chambers or spaces 14, 15.

The reservoir 21 and the working chambers 14, 15 are connected to a common feed line of a plurality of (here, six) brake cylinders 19 by way of controllable throttle valve units 18a, 18b arranged in parallel. Each valve unit includes a by-pass duct 17a, 17b provided with a non-return valve 16a, 16b respectively.

Figure 4:
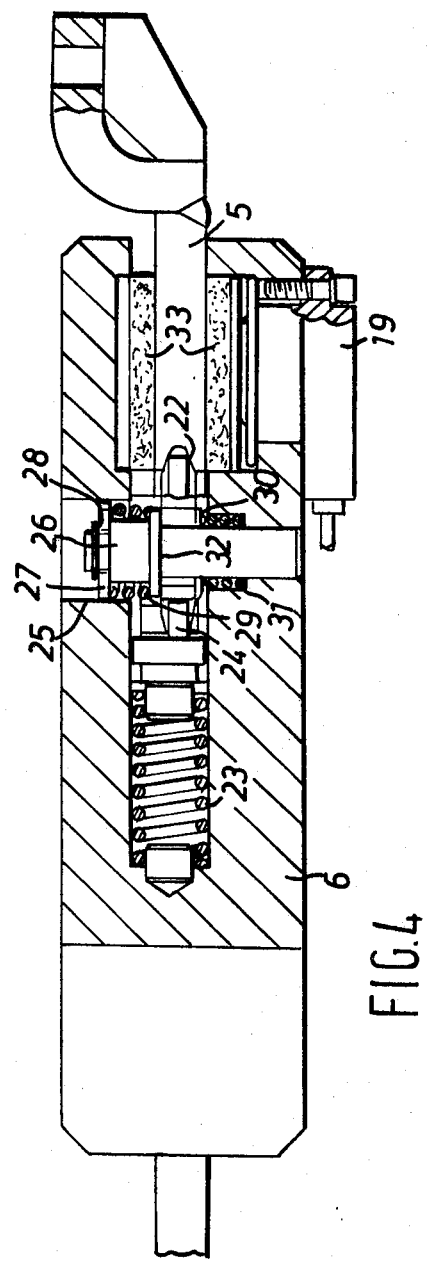
FIG. 4 is a longitudinal section of an automatic gap adjusting mechanism built into a brake calliper, taken on the plane A—A in FIG. 2 and shown on an enlarged scale.

FIG. 4 illustrates an automatic gap adjusting device. On the inner cylindrical surface of the brake disc 5, formed as an arcuate segment, there is a generally V-shaped groove 22; a roller 24 loaded by a pre-tensioned spring 23 engages this groove. A bolt or pin 26 guided in a bore 25 of the floating brake calliper 6 serves axially to stop or abut the roller 24. A pre-tensioned spring 27 guides the bolt 26 in the bore 25. Relative axial movement between the bolt 26 and the plate spring 27 is possible to the extent permitted by a predetermined clearance or gap 28 but this axial displacement takes place against the biasing force of a pre-tensioned spring 29. A spring 31 bearing against a plate or disc 30 ensures that the roller 24 at all times engages a shoulder or collar 32 of the bolt 26.

The apparatus operates as follows: When the articulated vehicle tends to jack-knife or if the trailer "hunts", i.e. sways, the angle included between the longitudinal axes of the tractor and trailer changes. This change in angle causes a relative angular displacement between the coupling mechanism 4 fixed to the tractor and the king-pin 3. With the moving part 9 of the hydraulic pressure source 8 being fixed to the king-pin 3 while its stationary part is fixed to the coupling mechanism 4, then depending on the angular sense of the rotation, in one or other of the working chambers 14, 15 of the source 8 the pressure changes proportionally to the angular velocity of the angular displacement.

As the working chambers 14, 15 are connected with the brake cylinders 19, there will be a braking force exerted which is proportional to the angular velocity of the angular displacement, and the brake linings 33 will be pressed to the brake disc 5. As the angular velocity decreases, so the pressure decreases in the working chambers 14, 15 of the hydraulic pressure source 8 and this pressure decrease is transmitted by way of the throttle valves 18a, 18b to decrease the pressure in the brake cylinders 19.

The automatic gap adjusting mechanism operates as follows: The floating brake calliper 6 is guided relative to the brake disc 5 by the roller 24 clamped in the groove 22 by the spring 23. The bolt or pin 26 bears against the upper end surface of the roller 24. The bolt 26 is guided radially and axially in the bore 25 of the brake calliper 6 by the pretensioned spring 27. The pre-tensioning in a radial direction of the spring 27 in the bore 25 is such that the frictional force generated in the axial direction is greater than the weight of the brake calliper 6 but smaller than the pressing or clamping force exerted by the brake cylinders 19.

Thus when the brake linings or pads 33 exhibit wear, the clamping force causes the spring 27 to abut the bolt or pin 26 and the brake calliper 6 slips relative to the bolt or pin 26 in an axial direction.

When the hydraulic clamping force ceases, the pre-tensioned spring 29 axially displaces the spring 27 on the bolt 26 in accordance with the value of the desired gap until abutment takes place and the spring 27 entrains the brake calliper 6.

We claim:

1. An anti-jack-knifing apparatus for an articulated vehicle including two members, namely a tractor (1) and a trailer (2), and a king-pin (3) for articulating said members together, the apparatus comprising a brake disc mechanism arranged coaxially with said king-pin and having cooperating braking elements (5) respectively connected to said tractor and to said trailer; a hydraulic pressure source (8) having a stationary part and a movable part (9), said stationary part being connected to one of said members (1, 2) while said movable part is connected to the other member; two working chambers (14, 15) and a throttle opening (13) being defined in said pressure source to establish throttled flow communication between said chambers; a plurality of brake cylinders (19); ducting connecting said cylinders with said chambers; and a respective controllable throttling valve unit (18a, 18b) in said ducting, each valve unit including a by-pass duct (17a, 17b) and a non-return valve (16a, 16b); wherein said braking elements are constituted by a brake disc formed as an arcuate segment (5) arranged on said trailer and a floating brake calliper (6) sandwiching said disc; and a coupling mechanism (4) on said tractor; a V-shaped groove (7) being defined in said coupling mechanism, and said brake calliper being fixed in said groove.

2. The apparatus as defined in claim 1, wherein a V-shaped second groove (22) is formed on an inner cylindrical surface of said brake disc (5); further comprising a roller (24) loaded by a pre-tensioned spring (23), located in said second groove; a bolt (26) axially bearing against said roller and being guided in a bore (25) defined in said brake calliper (6); and a plate spring (27) loosely mounted on said bolt and fitted in a pre-tensioned manner in said bore with axial play.

3. The apparatus as defined in claim 1, wherein said movable part (9) of the pressure source (8) is connected to said king-pin (3); and said pressure source includes a piston actuated by a rotary vane.

4. The apparatus as defined in claim 1, wherein said movable part (9) of the pressure source (8) is connected to said trailer (2) while said stationary part is connected to said tractor (1).

* * * * *